(No Model.)
C. C. CHESNEY.
SYSTEM OF TRANSMITTING AND DISTRIBUTING ELECTRICAL ENERGY.
No. 530,748. Patented Dec. 11, 1894.
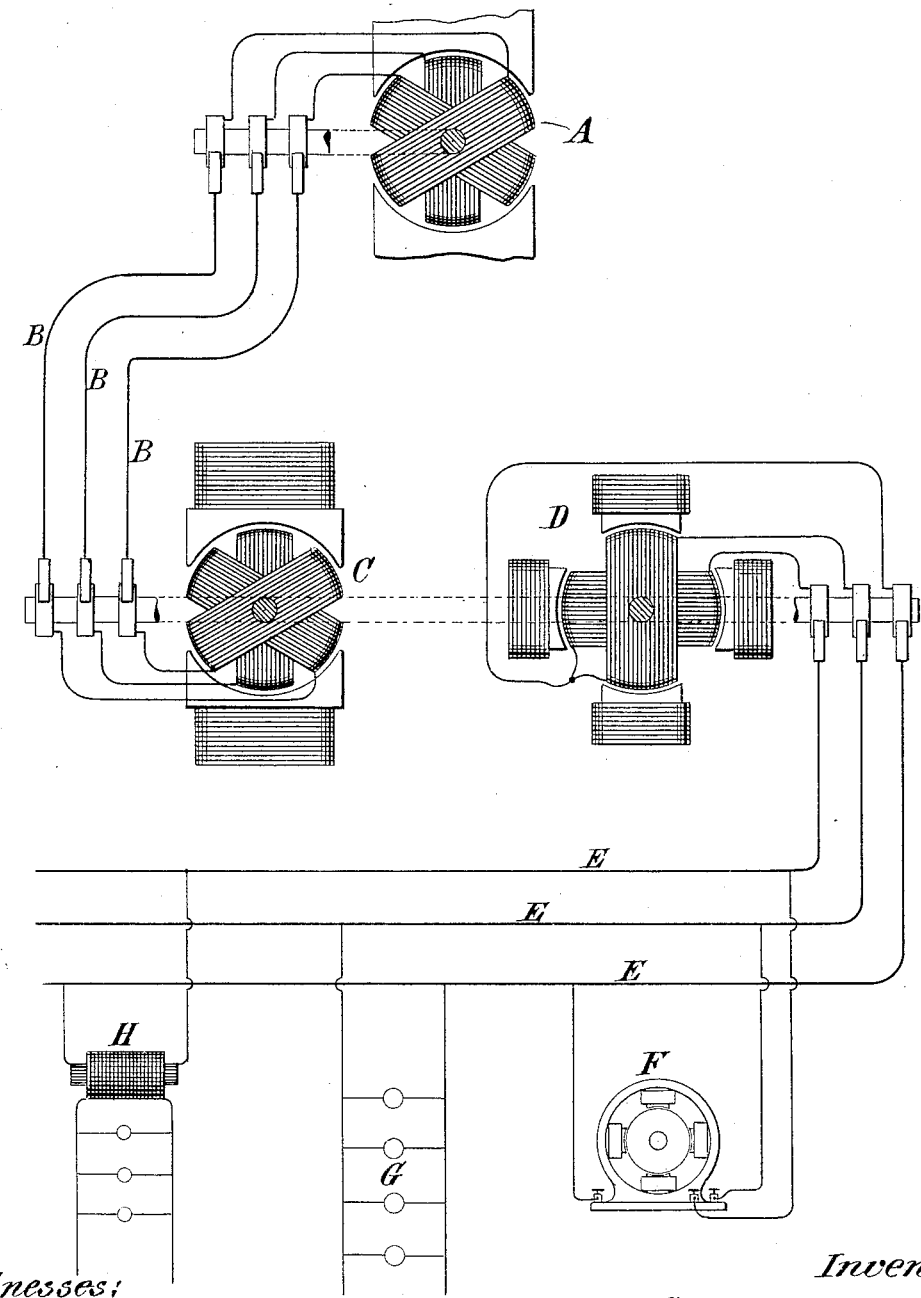

UNITED STATES PATENT OFFICE.

CUMMINGS C. CHESNEY, OF PITTSFIELD, MASSACHUSETTS, ASSIGNOR TO THE STANLEY LABORATORY COMPANY, OF SAME PLACE.

SYSTEM OF TRANSMITTING AND DISTRIBUTING ELECTRICAL ENERGY.

SPECIFICATION forming part of Letters Patent No. 530,748, dated December 11, 1894.

Application filed April 19, 1894. Serial No. 508,079. (No model.)

*To all whom it may concern:*

Be it known that I, CUMMINGS C. CHESNEY, a citizen of the United States, residing at Pittsfield, in the county of Berkshire and State of Massachusetts, have invented certain new and useful Improvements in Systems of Transmitting and Distributing Electrical Energy, of which the following is a specification, reference being had to the drawing accompanying and forming a part of the same.

A system of transmitting and distributing electrical energy is well known in which a single continuous or one or more alternating currents of high tension have been conducted from a suitable source to a motor coupled with a generator of alternating or of continuous currents and located at or near the center of distribution.

To systems of this nature my present invention pertains, the general objects being the same as those heretofore sought but the special object being to effect the transmission and distribution of energy more economically and with less complicated apparatus than heretofore.

In my improved system the transmission of the energy from the primary generator to the motor is effected by means of high-tension, low frequency, three phase currents, and the distribution by means of high frequency two phase currents into which the transmitted energy is converted. In other words, in carrying out my invention I employ a three-phase low frequency generator wound for high tension or operating step-up transformers, three interlinked transmission circuits and a three-phase motor connected with the same and located near the center of distribution. This motor is geared with a generator or forms one of the elements of a motor-transformer which produces two phase currents of high frequency which are carried off by the distribution circuits to lamps, motors or transformers.

The system involves no mechanism not heretofore known and in so far as the special types of the generators and motors are concerned the system is capable of great modification.

The drawing hereto annexed illustrates the system diagrammatically.

A is a primary source of three phase currents of high tension such as an ordinary three phase generator directly wound for high tension. B B B are the line conductors leading from this generator to a convenient point near the center of the district through which current is to be distributed. At such point is located a suitable motor-transformer such as a three phase motor C driving a two phase generator D, which latter may be of any proper construction but is preferably of the character shown and described in patent to Stanley, Jr., and Kelly, No. 499,446, dated June 13, 1893, with such well understood modifications as the conditions of the special case require.

Each side of the device constituting the motor-transformer is provided with the number of poles corresponding to the frequency desired, the two phase generator side having a large number of poles for high frequency. Two circuits formed as by conductors E E E convey the two phase currents to any desired point within the distribution district and supply energy to motors as F, lamps as G or transformers as H.

The two phase generator may be of any voltage whatever depending on local conditions.

By the system as described the several peculiar advantages of high and low frequency, two and three phase currents are fully realized. The three-phase transmission has the advantages that for the same maximum voltage and same loss in leads, the amount of copper required for the leads is less, and also, that the drop due to self-induction is less.

The chief advantage of low frequency is the reduction of the drop due to self induction, but when large currents have to be carried, it is also of advantage in that the increased loss due to uneven distribution of the current in the conductor is less. On the other hand, the advantages of two phase and high frequency are well established. The connections are simple. There is no interference between the loads on the different circuits as with three phase systems. Two transformers only are required for a motor and, on account of the high frequency, the cost of transformers for all purposes is less.

As the high frequency current is generated near where it is to be used, the difficulties due to self induction and the like are obviated, while in the case of a three-phase current of low frequency, the increased cost of transformers and the poor regulation due to uneven loading are avoided, the latter because the load is distributed evenly by the motor.

When the motor is synchronous, another important advantage is received, as in such case the drop in the long transmission leads is prevented from affecting the regulation of the two phase circuits. Since the speed of the primary generator and motor is constant, that of the secondary generator and hence its electro motive force will be constant also. It is only necessary therefore to allow, in the secondary circuits for the drop of the secondary leads and two phase armature.

What I claim is—

1. The method of transmitting and distributing electric energy which consists in generating three phase currents of low frequency and high tension, operating by these a motor, driving by such motor a two phase generator adapted to yield currents of high frequency and distributing such currents to translating devices, as set forth.

2. The combination in a system of transmitting and distributing electric energy, of a three phase generator, a three phase motor located near the center of distribution driven by the currents from said generator, a two phase secondary generator mechanically connected with said motor, and translating devices supplied with current from the two phase generator as set forth.

3. The combination in a system of electrical transmission and distribution, of a primary three phase generator adapted to produce currents of low frequency and high tension, a three phase motor near the center of distribution operated by the currents from said generator, a two phase secondary generator adapted to produce currents of high frequency and translating devices operated thereby as set forth.

CUMMINGS C. CHESNEY.

Witnesses:
JOHN F. KELLY,
F. TH. O. CHYTROUS.